(12) United States Patent
Bisset

(10) Patent No.: US 8,456,669 B2
(45) Date of Patent: *Jun. 4, 2013

(54) PRINTING SYSTEM

(75) Inventor: Douglas Bisset, Stevenage (GB)

(73) Assignee: Xerox Corporation, Norwalk, CT (US)

( * ) Notice: Subject to any disclaimer, the term of this patent is extended or adjusted under 35 U.S.C. 154(b) by 1226 days.

This patent is subject to a terminal disclaimer.

(21) Appl. No.: 12/277,836

(22) Filed: Nov. 25, 2008

(65) Prior Publication Data
US 2010/0128301 A1 May 27, 2010

(51) Int. Cl.
G06F 3/12 (2006.01)
G06F 15/16 (2006.01)
G06F 15/173 (2006.01)
B41J 2/175 (2006.01)
G03G 21/14 (2006.01)
G03G 15/00 (2006.01)
G03G 21/02 (2006.01)

(52) U.S. Cl.
USPC ............. 358/1.15; 347/88; 399/37; 399/77; 399/405; 399/79; 709/203; 709/223; 709/218

(58) Field of Classification Search
USPC ............. 358/1.15; 347/88; 399/37, 77, 405, 399/79, 85, 362, 367; 709/203, 223, 218
See application file for complete search history.

(56) References Cited

U.S. PATENT DOCUMENTS

| | | | |
|---|---|---|---|
| 5,457,516 A * | 10/1995 | Kim ............................. | 399/37 |
| 6,010,257 A * | 1/2000 | Petteruti et al. ............... | 400/88 |
| 6,243,548 B1 * | 6/2001 | Hebert et al. .................. | 399/79 |
| 6,522,862 B2 * | 2/2003 | Koshimizu et al. ........... | 399/405 |
| 7,222,153 B2 * | 5/2007 | Ando et al. .................... | 709/203 |
| 7,794,040 B2 * | 9/2010 | Snyder ........................... | 347/19 |
| 2002/0091812 A1 * | 7/2002 | Ando et al. .................... | 709/223 |
| 2007/0103523 A1 | 5/2007 | Snyder et al. | |
| 2007/0296778 A1 | 12/2007 | Snyder | |

* cited by examiner

Primary Examiner — Akwasi M Sarpong
(74) Attorney, Agent, or Firm — Fay Sharpe LLP

(57) ABSTRACT

According to one aspect of the present disclosure, a print system is provided comprising a plurality of networked print engines in communication with one another, a presence detector, and a controller to communicate with the presence detector to determine a user presence and to access usage data of each of the plurality of print engines. The controller combines and shares the user presence and the usage data to adjust operations of the plurality of print engines enabling quick entry to, and quick exit from, power saving mode of at least two of the plurality of print engines.

14 Claims, 3 Drawing Sheets

PRINTING SYSTEM

BACKGROUND

The solid ink printing process has many advantages over traditional ink jet printing technology. Print speed, color gamut, water fastness, and media flexibility are but a few of the advantages for solid ink printing. Solid ink jet printing generally involves using a solid ink that is melted and jetted onto a transfer surface, and then fixed onto the media from the transfer surface. Because the ink is solid until melted, both the ink and the transfer surface need to be at relatively high temperatures compared to an ink jet printing process using liquid inks. Further, the ink must be kept in a molten state to overcome a relatively long warm-up and purge process that occurs if the ink is allowed to solidify.

Highly engineered mechanisms, set points, inks, and operating software are used to try to meet the combined requirements of fast warm up time, low power usage, and minimal ink cooking. Yet, as competing technologies progress, and companies thrive to improve customer satisfaction, there is increasing pressure to continue to reduce power requirements, reduce warm-up times, and meet all environmental and energy saving programs. In addition, there is a need to utilize a plurality of printers in a cost effective and efficient manner by sharing of intelligent ready information in order to improve user experience with a print system.

BRIEF DESCRIPTION

According to one aspect of the present disclosure, a print system is provided comprising a plurality of networked print engines in communication with one another, a presence detector, and a controller to communicate with the presence detector to determine a user presence and to access usage data of each of the plurality of print engines. The controller combines and shares the user presence and the usage data to adjust operations of the plurality of print engines enabling quick entry to, and quick exit from, power saving mode of at least two of the plurality of print engines.

According to another aspect of the present disclosure, a method is provided for operating a print system, comprising a print system including a plurality of printers. The method operates the print system in a first mode based on determined usage data and receiving an input from a presence detector. The method further provides for adjusting operation of at least two of the plurality of printers to a second mode based upon a combination of the usage data and the input from the presence detector.

According to yet another aspect of the present disclosure, a method of operating a print system is provided, comprising receiving usage data from at least one printer from a network; sharing the usage data from the at least one printer to at least another printer; comparing the usage data to current print system arrangement; adjusting the print system, wherein adjusting is selected from the group consisting of adjust power mode to at least one printer to a lower mode, adjust power mode to at least one printer to a higher power mode, and make no adjustment to any printer.

DETAILED DESCRIPTION

Figure 1:
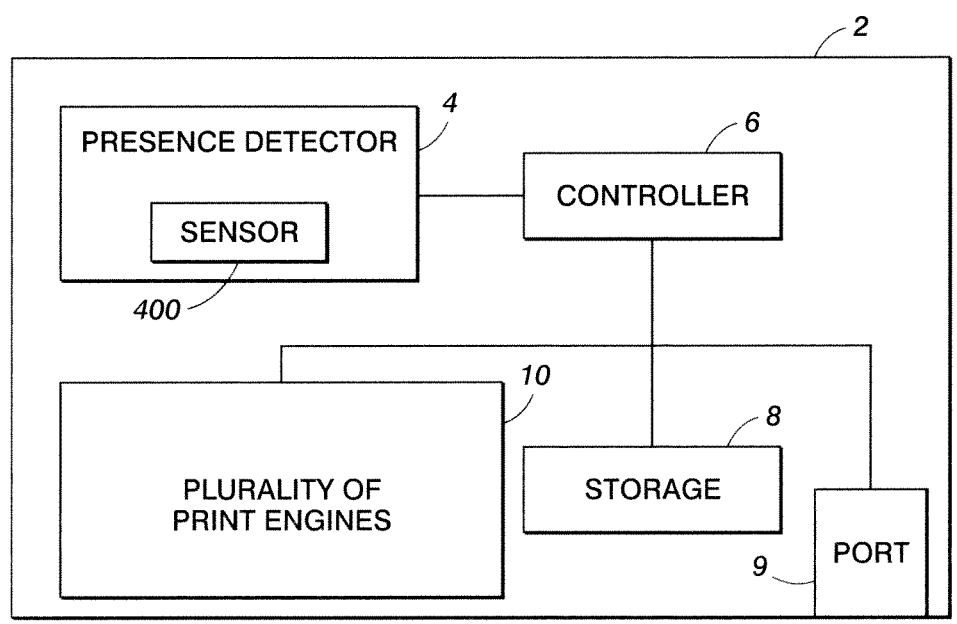
FIG. 1 shows an embodiment of a printing system having a plurality of printers, a presence detector, and a controller.

A print system 2 is shown in FIG. 1. The print system 2 can be any plurality of devices, or combination of devices, that have print capabilities such as printers, fax machines, copiers or a combination of these capabilities, typically referred to as a multi-function device or multi-function peripheral. The use of the term 'printers' and 'print system' are in no way intended to limit the scope of the claims to any one of these devices.

The print system 2 of FIG. 1 can have a plurality of print engines 10 that share the printing demands to produce printed output, such as text, images, graphics or a mix of any of these. The print engines may receive these requests from a user standing in front of the print system, such as a multi-unit or plurality of copiers, where the user would place an item to be copied on a platen, not shown. The print system could then scan the item and render an image of it. Similarly, the print engines can receive the requests through a port 9, which may be a serial port connected to a user's personal computer, or may be a network port connecting the print system to the network. The network port can also be an Ethernet port, a wired network port, a wireless port, such as those in compliance with the Institute of Electrical and Electronic Engineers standard 802.11, an infrared port, etc.

Print systems, and the associated printers, generally have different states of readiness. When the print system is fully warmed up and can print immediately upon receiving a print job, or print request, the system is in a ready mode. When the print system is in its lowest power mode, it can be referred to as being in a sleep power mode. When the print system is in some state between these two, similar to a standby or waiting mode, it can be referred to as being in a low power mode. The print system can have several low power modes.

In many print systems, sleep and low power modes can present problems. For example, with a solid ink printer, the ink must be maintained in a molten state in order to be able to immediately print. If the ink cools beyond a particular temperature, the print head has to be heated and purged before printing can be done. Many different approaches have been used to reduce the time between the print system being in either a low or a sleep power mode and being ready to print. These include varying the temperatures and times that heaters are run for both the print head and the drum, adding insulation to the devices, changing the position of the hot parts relative to other components, and modifying and optimizing the inks.

One approach is to predict time periods of repeated use by analyzing historic usage data. In periods of predicted high use, the plurality of printers are kept in the ready power mode, or in low power modes that can reach the ready power mode quickly. In periods of predicted lower use, the plurality of printers are moved to power states lower than ready, such as, low or sleep power modes. The predicted use, or usage data, may be apportioned in several different ways, such as on a time and calendar basis. The usage data may be stored in storage 8 and accessed by the controller, or otherwise used to control the settings of the plurality of printers in a print system.

In one approach, shown in U.S. Pat. No. 6,243,548, commonly owned by the assignee of the current application, the usage data is set out in a 24 hour by 7 day grid. The usage data in this example consists of a setting, based upon daily and hourly historical and predicted use of the print system, where the setting corresponds to ready power, low power or sleep power. This is merely one example of usage data and is not intended to limit application of usage data in any way. Many methods of determining power settings based upon predicted use may exist and no restriction to any particular implementation is intended.

In practice, exceptions to the predicted use, i.e. unexpected usage, can result in user dissatisfaction with the warm up time. Adapting a print system to include a presence detector 4 allows supplemental information to be combined with usage data in order to more accurately predict use, share unexpected events, and achieve more responsive print systems. Sharing the supplemental information from one printer to another printer provides for a more responsive print system. The print system 2 of FIG. 1 can have a presence detector 4 for each printer. The presence detectors 4 can include a sensor 400, such as a vision system, light, motion, heat, pressure, sound, or vibration sensor, among others, and some logic or other control to generate a signal based upon the data received at the sensor.

As will be discussed later, the presence detectors 4 can also include intelligence information to control the output of the presence detectors 4, although the intelligence information can also reside in the controller 6. The intelligence information can be embodied as an algorithm implemented in code and executed by the controller 6. For example, in the simplest case the controller 6 or presence detectors 4 wake up the printer(s) if the presence detector 4 "sees" anything. In a more complex case the controller 6 wakes up one or more of the plurality of printers 10 based on the probability of getting a job, the status of printers 10, sharing of unexpected events, and the extent of the job. The probability of the printers 10 receiving a job may be based on historical or previous usage patterns versus current usage patterns, as an example.

The presence detector 4 may be used in combination with the usage data to adjust the power setting in the presence of a user, adjust the power setting in the absence of a user, adjust the power in the event of unexpected usage, as well as, adjust the power in response to the status of other print engines in the plurality of printers 10. The usage data may be stored in storage 8 and used to adjust historical patterns. As discussed, a desirable outcome is to have a first printer(s) ready to print as quickly as possible and have another or second printer(s) ready to print when first printer(s) is moving towards unavailability or when the presence detectors 4 determine that more than one printer should be moved to, or from, ready power mode.

Figure 2:
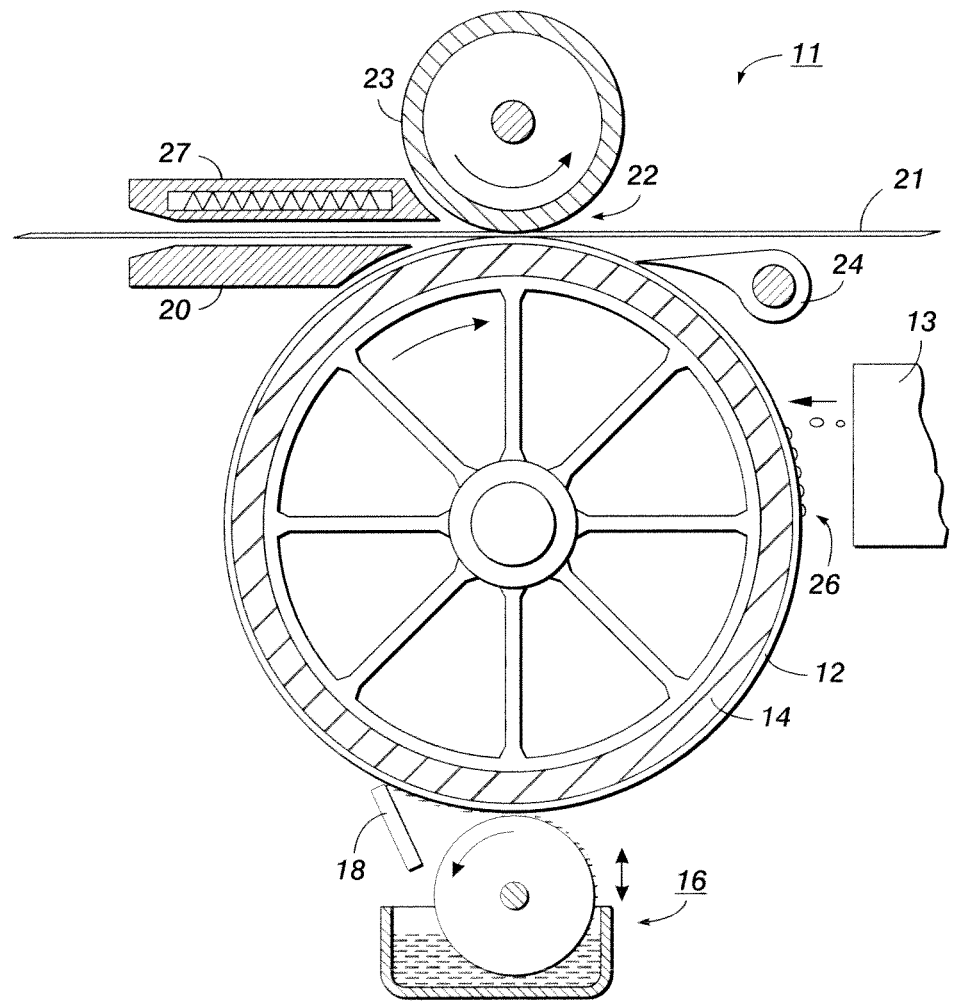
FIG. 2 shows an embodiment of a solid ink print engine.

An example of an individual solid ink print engine using an intermediate transfer surface is shown in FIG. 2. The print engine 11 shown in FIG. 2 is only intended as an example and it not intended in any way to limit the scope of the claims. The print engine may be any print engine, such as part of a printer, copier, fax machine or a multi-function device that has the capability of performing more than one of these functions. The print system has a print head 13 that deposits ink dot 26 on an intermediate transfer surface 12 to form an image. The support structure 14 supports the intermediate transfer surface 12. For ease of discussion, the support structure will be referred to here as a drum, but may be a drum, a belt, etc. The intermediate transfer surface 12 may be a liquid applied to the support structure 14 by an applicator, web, wicking apparatus, and metering blade assembly 18 from a reservoir 16.

The ink dots 26 form an image that is transferred to a piece of media 21 that is guided past the intermediate transfer surface by a substrate guide 20, and a media pre-heater 27. In solid ink jet systems, the system pre-heats the ink and the media prior to transferring the image to the media in the form of the ink dots. A pressure roller 23 transfers and fixes (transfixes) the ink dots onto the media at the nip 22. The nip is defined as the contact region between the media and the intermediate transfer surface. It is the region in which the pressure roller compresses the media against the intermediate transfer surface. This pressure, combined with elevated temperatures, achieves the transfer of the image. One or more stripper fingers, such as 24, may assist in lifting the media away from the intermediate transfer surface.

The print head 13 is heated to keep the ink in a molten state optimal for jetting needs. The media 21 and the intermediate transfer surface are also heated to allow the solid ink to remain in a visco elastic state for optimal image transfer onto the media. Both the print head and drum take time to achieve operating temperature when transitioning from the non-operating modes. Using the presence detector 4 together with the usage data, it may be possible to reduce the length, or eliminate the impact all together, of the warm-up times, at least for a percentage of the print jobs and/or customers. In this manner, circumstances not anticipated by the usage data may be adapted to both power up the print system, including multiple print engines, in anticipation of, or detection of, use and lower the power setting of the print system in the absence of anticipated, or detected, use.

For example, it is well known that there is reduced printing for many printers on the weekends, other non-work days, and night time of work days. Therefore, using usage data alone, the printer would predict low usage and remain in sleep mode. However, if the print system detected movement, it could adapt by changing to a higher power and alert its "buddies", i.e. share intelligent ready information, to exit power-saving mode, and thereby reduce time to move to the ready power mode. In a more complex example, the combination of motion and usage data may be used to differentiate between users. For example, if the presence detector 4 were to employ a vision system, the print system could use the vision system to identify a user by visual characteristics. For other types of presence detectors, profile or pattern recognition could be used to identify users that have higher print probabilities than others.

Similarly, usage data that has the print system in low power or in ready power modes can be adjusted and/or shared based upon an absence of users. For example, the usage data may dictate that the print system be in ready power mode on Monday mornings. If a period of time elapses and there is no detection of usage or presence, such as would occur on a holiday that falls on a Monday, the print system may enter a lower power mode other than what the usage data would otherwise indicate. This unexpected usage can be shared with other printers that have not detected the unexpected usage. This sharing of usage can be communicated to printers that typically are 'staged' or 'staggered' into ready power mode during normal usage, thereby superseding the 'normal' ready power mode schedules/sequences. This allows the print system to conserve power, while minimizing the risk of causing a user to wait longer than desired for a print job.

Further, the presence detectors 4 can also provide data with regard to degrading quality and/or impending unavailability of one or more printers. In anticipation, a second printer can be moved to print ready mode. In addition, to hasten print ready mode, it is possible in some solid ink print systems to print before all of the heated components reach their operating temperatures. For example, a solid ink printer may include capabilities of printing an image when the drum or print head are at a slightly reduced temperature from their normal operating temperature. If faster warm-up can be achieved, it would be desirable to adjust the operating parameters of the print system such that the first print out is as fast as possible with acceptable print quality. Such adjustments may include slower transfix velocity, higher media preheat temperature, lower jetting frequency, drum temperature, a print head temperature, a print head voltage, a print head waveform, etc. In any of the circumstances in which all the components are not at their ready power operating temperatures, however, there may or may not be a reduction in image quality. In addition, degrading quality or impending unavailability of one printer can be shared such that another printer can be placed in power ready mode to 'take over' when quality degrades to a certain level or when one printer becomes unavailable.

Using the presence detector 4, however, the need to make the trade-off between a possible print quality reduction and faster warm-up time may be controlled. For example, a user sends a print job to the print system 2 across the network. The print system 2 may otherwise try to print the job as quickly as possible, using some of the operational adjustments described above. However, if the print controller determines that the print request came across the network and the presence detector does not indicate a user standing by the print system waiting for the print request to be completed, the print system may enter a process of going to print ready mode. If a user walks up during this warm-up process, the controller may then choose to print using the reduced temperature operating adjustments. Without the presence of a user, then, the print system would wait until the entire system is up to normal operating temperatures before printing.

Figure 3:
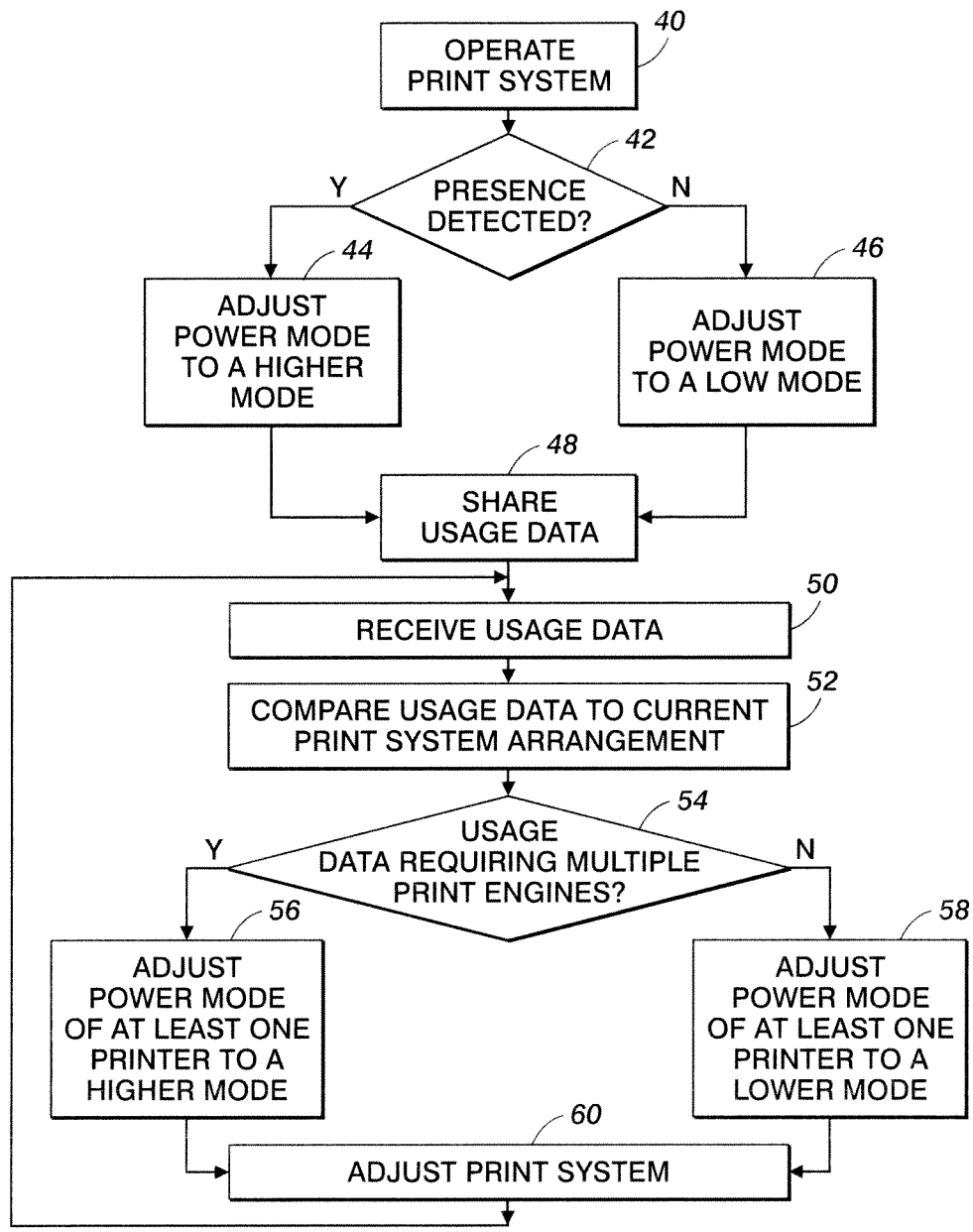
FIG. 3 shows an embodiment of a method of operating a print system having a plurality of printers in a shared network.

An exemplary embodiment of the above described processes is shown in FIG. 3 wherein the print system is to be operated at 40 in whatever mode is indicated by usage data, in whatever form the usage data takes. If a user presence is detected at 42, the print system operation is adjusted to a higher mode at 44. Depending upon the nature of the presence detected, the print system may move from a sleep power mode to a low power mode, a sleep power mode to a ready power mode with an option to print at reduced temperatures, or from a low power mode to a ready power mode. If the detected usage data affects other printers in the system, then the usage data is shared 48 within the network in order to communicate intelligent ready information.

For example, if the print system is in a sleep power mode and movement is detected at a very low level, the print system may move from the sleep power mode to low power mode. If the print system is in sleep power mode or low power mode, the print system may move to a ready power mode if the user presence is high or shared usage data indicates unexpected demand. Thus, if one printer that is normally idle experiences unexpected usage particularly in moderate to large volumes, it may be likely that a special event such as unplanned weekend working or overtime/additional shifts have been arranged. In this eventuality, the solid ink machine can alert its 'buddies' (i.e. networked plurality of printers) to exit power-saving mode and become ready, thus avoiding delays to the user. If one machine becomes unavailable, for example it is out of service or scheduled for maintenance when it is normally busy, it can alert its 'buddies' that print jobs are expected and it will not be able to print them. If the 'buddies' were idle, they would then exit power-saving mode and expect non-standard usage patterns until they learned that their neighbor was fully functional or usage returns to standard patterns. In some circumstances, where some machines are under 24-hour use, intelligent ready maintenance information can be shared to ensure that multiple machines do not enter a maintenance mode simultaneously and that the optimal time for the maintenance is chosen based upon both machines' usage rates.

If no user presence is detected at 42, the print system can enter a lower power mode than the current mode at 46. If the usage data has the print system at full power and no presence is detected, the print system can enter a low power mode or a sleep power mode. If the print system is in a low power mode and no user presence is detected, the print system can enter a sleep power mode.

In addition, it is possible that the presence detected or a lack of a presence detected may match the power mode in which the print system is already operating. In this case, the mode may be considered to be adjusted, in that the current mode is confirmed.

The presence detector or controller can set a predeterminable time period to elapse, i.e. five minutes. If no presence is detected in five minutes, the presence detector may send a signal indicating no users are present. Alternatively, if the controller set the time period, the controller may determine that there is no user presence if no presence is detected after the time elapses. The amount of time selected in this example may be determined by the nature of the sensor, as well as the conditions surrounding the print system, as possible factors. If the print system is in a high-traffic area, for example, it may require a longer period of time to allow the controller to 'learn' the difference between normal activity and non-normal activity. In whatever manner the parameters are set for a user absence or 'no user presence,' the resulting determination of such will cause the print system to enter a lower power mode than its current mode and share that information with other printers in the system.

In either case, whether the print system is moved to a higher or lower power mode relative to its current mode, the resulting adjusted mode may be shared 48 (refer to FIG. 3) for further analysis or adjustment of the usage data. This may include sharing the results of the mode adjustment, sharing the current setting and the presence data in whatever form that may take such as a detected quality degradation, impending failure, etc. Alternatively, the usage data for that period of time or other parameter by which the usage data is organized may just be set to the adjusted mode. It should be noted that where the usage data and the presence detection or lack thereof results in no change, that result may be shared as well as a verification of the previous usage data.

FIG. 3 further shows an example of a process in which a presence detector input and usage data cause the print system to control the warm up cycles for a plurality of printers in a less-than-full power mode, i.e. between low power and ready power. The print system receives usage data at 50, when the print system is in either a sleep power or low power mode. At 52, the print system compares the usage data to current print system arrangement. At 54, if the print system requires more 56, or less 58, printers then adjustment is made accordingly. Warm up state is monitored while at 60 the print system is adjusted for a user presence and/or usage data.

In this manner, a presence detector 4 adds to previously set usage data and shares unexpected usage to allow more accurate predictions of print processes, thereby allowing the print system to adjust and to achieve faster warm up times and faster entry into power saving modes. This will result in better user experiences and more efficient arrangements of solid inkjet printing systems, as well as many other printing systems that require a warm up.

It will be appreciated that various of the above-disclosed and other features and functions, or alternatives thereof, may be desirably combined into many other different systems or applications. Also that various presently unforeseen or unanticipated alternatives, modifications, variations, or improvements therein may be subsequently made by those skilled in the art which are also intended to be encompassed by the following claims.

The invention claimed is:

1. A print system, comprising: a plurality of networked print engines in communication with one another; a presence detector;
   a controller to communicate with the presence detector to determine a user presence and to access usage data of each of the plurality of print engines;
   wherein the usage data comprise historical usage demands regarding the plurality of print engines;
   the controller combines and shares the user presence and the usage data to adjust operations of the plurality of print engines enabling quick entry to, and quick exit from power saving mode of at least two of the plurality of print engines; and
   wherein the controller combines and shares the user presence and the usage data to adjust operations of at least a first print engine and a second print engine enabling quick exit from a power saving mode to a power ready mode of the at least second print engine in response to usage data;
   wherein the historical usage demands comprises daily and hourly usage data.

2. The print system of claim 1, wherein the plurality of print engines further comprise solid ink print engines.

3. The print system of claim 1, further comprising a port to allow the print system to connect to a network.

4. The print system of claim 3, the port further comprising one selected from the group consisting of: an Ethernet port, a wired network port, a wireless network port, and an infrared network port.

5. The print system of claim 1, wherein the usage data includes the first print engine being unavailable.

6. The print system of claim 1, wherein the usage data includes an unexpected increase in demand on the first print engine.

7. The print system of claim 1, wherein the usage data includes an unexpected decrease in demand on the first print engine.

8. The print system of claim 1, the presence detector further to indicate one of either unexpected increased usage or unexpected decreased usage.

9. A method of operating a print system, comprising:
   operating the print system in a first mode determined by usage data; receiving an input from a presence detector;
   adjusting operation of at least two of the plurality of printers to a second mode based upon a combination of the usage data and the input for the presence detector;
   wherein the usage data comprises historical usage demands of the at least two of the plurality of printers; and,
   wherein adjusting operation of the print system further comprises adjusting operation of another printer from the first mode to the second mode wherein the second mode is a higher power mode than the first mode;
   wherein the print system includes a plurality of printers;
   wherein the historical usage demands comprises daily and hourly usage data.

10. The method of claim 9, wherein receiving the input from the presence detector further comprises determining that no user is present.

11. A method of operating a print system, comprising:
    receiving usage data from at least one printer from a network; sharing the usage data from the at least one printer to at least another printer; comparing the usage data to current print system arrangement;
    wherein the usage data comprises historical usage demands of the at least one printer;
    adjusting the print system, including adjusting power mode to at least one printer to a higher power mode;
    receiving the usage data from a presence detector indicating a user presence; determining that the print system is not in the ready power mode;
    adjusting printing operation parameters to allow the print system to print before achieving the ready power mode in response to the user presence; and,
    wherein adjusting the print system operation parameters further comprises adjusting at least one of: a drum temperature, a transfix roller velocity, a media preheat setting, a print head temperature, a print head voltage, a print head waveform, and an ink jetting frequency;
    wherein the historical usage demands comprises daily and hourly usage data.

12. The method of claim 11, wherein operating the print system further comprises operating the print system in one of either a scheduled sleep mode or a scheduled low power mode.

13. The method of claim 11, wherein operating the print system further comprises adjusting scheduled power mode to an unscheduled power mode based on the sharing of usage data.

14. The method of claim 11, wherein adjusting the print system operation parameters further comprises adjusting at least one of: a drum temperature, a transfix roller velocity, a media preheat setting, a print head temperature, a print head voltage, a print head waveform, and an ink jetting frequency.

* * * * *